United States Patent
Lee et al.

(10) Patent No.: US 7,658,508 B2
(45) Date of Patent: Feb. 9, 2010

(54) BACKLIGHT ASSEMBLY AND DISPLAY DEVICE HAVING THE SAME

(75) Inventors: Yong-Woo Lee, Suwon-si (KR); Yong-Il Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 160 days.

(21) Appl. No.: 11/188,349

(22) Filed: Jul. 25, 2005

(65) Prior Publication Data

US 2006/0072322 A1    Apr. 6, 2006

(30) Foreign Application Priority Data

Oct. 1, 2004    (KR) ............... 10-2004-0078271
Dec. 27, 2004    (KR) ............... 10-2004-0112984

(51) Int. Cl.
*F21V 7/04* (2006.01)

(52) U.S. Cl. ............ 362/225; 362/235; 362/244; 362/27; 362/600; 362/611

(58) Field of Classification Search .......... 362/225, 362/227, 235, 244, 26, 27, 600, 611, 614, 362/631–634, 559, 561, 260, 812; 40/558; 349/58–69
See application file for complete search history.

(56) References Cited

U.S. PATENT DOCUMENTS

| | | | | |
|---|---|---|---|---|
| 3,712,981 A | * | 1/1973 | Eargle, Jr. ............ | 362/216 |
| 5,675,484 A | * | 10/1997 | Shimada ............ | 363/71 |
| 6,796,678 B2 | * | 9/2004 | Moon ............ | 362/225 |
| 6,843,584 B2 | * | 1/2005 | Bang et al. ............ | 362/249 |
| 6,916,102 B2 | * | 7/2005 | Lin ............ | 362/634 |
| 2003/0142487 A1 | * | 7/2003 | Fan ............ | 362/29 |
| 2004/0213018 A1 | * | 10/2004 | Torihara ............ | 362/561 |
| 2005/0073858 A1 | * | 4/2005 | Kim et al. ............ | 362/561 |
| 2005/0134183 A1 | * | 6/2005 | Park et al. ............ | 315/58 |
| 2006/0126321 A1 | * | 6/2006 | Lim ............ | 362/29 |

FOREIGN PATENT DOCUMENTS

| | | | |
|---|---|---|---|
| JP | 05166854 | * | 1/1995 |
| JP | 08003357 | * | 7/1997 |
| JP | 2001013512 | * | 1/2001 |

* cited by examiner

*Primary Examiner*—Sandra L O'Shea
*Assistant Examiner*—Mark Tsidulko
(74) *Attorney, Agent, or Firm*—Cantor Colburn LLP

(57) ABSTRACT

A backlight assembly includes at least one U-shaped lamp, a first connecting member, and a second connecting member. The U-shaped lamp includes a U-shaped lamp tube, a first external electrode covering a first end portion of the U-shaped lamp tube, and a second external electrode covering a second end portion of the U-shaped lamp tube. The U-shaped lamp tube generates light when a first driving voltage is applied to the first external electrode and a second driving voltage is applied to the second external electrode. The first connecting member is electrically connected to the first external electrode for applying the first driving voltage to the first external electrode. The second connecting member is electrically connected to the second external electrode for applying the second driving voltage to the second external electrode. Therefore, interference between a wire for applying power to the U-shaped lamp and the U-shaped lamp is reduced.

33 Claims, 15 Drawing Sheets

BACKLIGHT ASSEMBLY AND DISPLAY DEVICE HAVING THE SAME

This application claims priority to Korean Patent Application No. 2004-78271 filed on Oct. 1, 2004 and Korean Patent Application No. 2004-112984 filed on Dec. 27, 2004 and all the benefits accruing therefrom under 35 U.S.C. §119, and the contents of which in their entireties are herein incorporated by reference.

BACKGROUND OF THE INVENTION

1. Field of the Invention

The present invention relates to a backlight assembly and a display device having the backlight assembly. More particularly, the present invention relates to a backlight assembly capable of enhancing productivity and reducing power consumption, and a display device having the backlight assembly.

2. Description of the Related Art

A liquid crystal display ("LCD") device includes an LCD panel for displaying an image and a backlight assembly for providing the LCD panel with light. As a size of the LCD panel increases, a size of the backlight assembly also increases. As a result, the LCD device employs a direct illumination type backlight assembly.

The direct illumination type backlight assembly includes a plurality of lamps. In general, the direct illumination type backlight assembly employs a plurality of cold cathode fluorescent lamps ("CCFLs") and therefore requires a plurality of inverters in order to drive the plurality of CCFLs that are electrically connected in parallel. As a result, cost for manufacturing the direction illumination type backlight assembly is increased and productivity is lowered.

Furthermore, the direction illumination type backlight assembly requires wires for electrically connecting the CCFLs to inverters. The inverters are disposed at a first end of each CCFL, so that a wire electrically connected to a second end of the CCFL, which is opposite to the first end, must extend back towards the first end and connect to the inverters to induce electromagnetic fields, and such an arrangement deteriorates luminance uniformity of the backlight assembly and increases power consumption.

BRIEF SUMMARY OF THE INVENTION

The present invention provides a backlight assembly capable of enhancing productivity and reducing power consumption.

The present invention also provides a display device having the above-described backlight assembly.

In exemplary embodiments of a backlight assembly, the backlight assembly includes at least one U-shaped lamp, a first connecting member and a second connecting member. Each U-shaped lamp includes a U-shaped lamp tube, a first external electrode covering a first end portion of the U-shaped lamp tube, and a second external electrode covering a second end portion of the U-shaped lamp tube. The U-shaped lamp tube generates light when a first driving voltage is applied to the first external electrode and a second driving voltage is applied to the second external electrode. The first connecting member is electrically connected to each first external electrode for applying the first driving voltage to the first external electrode. The second connecting member is electrically connected to each second external electrode for applying the second driving voltage to the second external electrode.

In exemplary embodiments of a display device, the display device includes a display panel and a backlight assembly. The display panel displays an image by using light. The backlight assembly provides the display panel with the light. The backlight assembly includes at least one U-shaped lamp, a first connecting member and a second connecting member. Each U-shaped lamp includes a U-shaped lamp tube, a first external electrode covering a first end portion of the U-shaped lamp tube, and a second external electrode covering a second end portion of the U-shaped lamp tube. The U-shaped lamp tube generates light when a first driving voltage is applied to the first external electrode and a second driving voltage is applied to the second external electrode. The first connecting member is electrically connected to each first external electrode for applying the first driving voltage to the first external electrode. The second connecting member is electrically connected to each second external electrode for applying the second driving voltage to the second external electrode.

In other exemplary embodiments of a backlight assembly, the backlight assembly includes a plurality of lamps and a single inverter electrically connected to the plurality of lamps, wherein the inverter provides first and second driving voltages to each lamp within the plurality of lamps. According to embodiments of the present invention, the backlight assembly employs only one inverter for driving a plurality of U-shaped lamps electrically connected in parallel to enhance productivity.

Furthermore, the first and second wires for connecting the U-shaped lamp to the inverter are disposed at one side of the backlight assembly, so that interference between the wires and the U-shaped lamp is reduced.

BRIEF DESCRIPTION OF THE DRAWINGS

The above and other features and advantages of the present invention will become more apparent by describing in detailed exemplary embodiments thereof with reference to the accompanying drawings, in which.

DETAILED DESCRIPTION OF THE INVENTION

Figure 1:
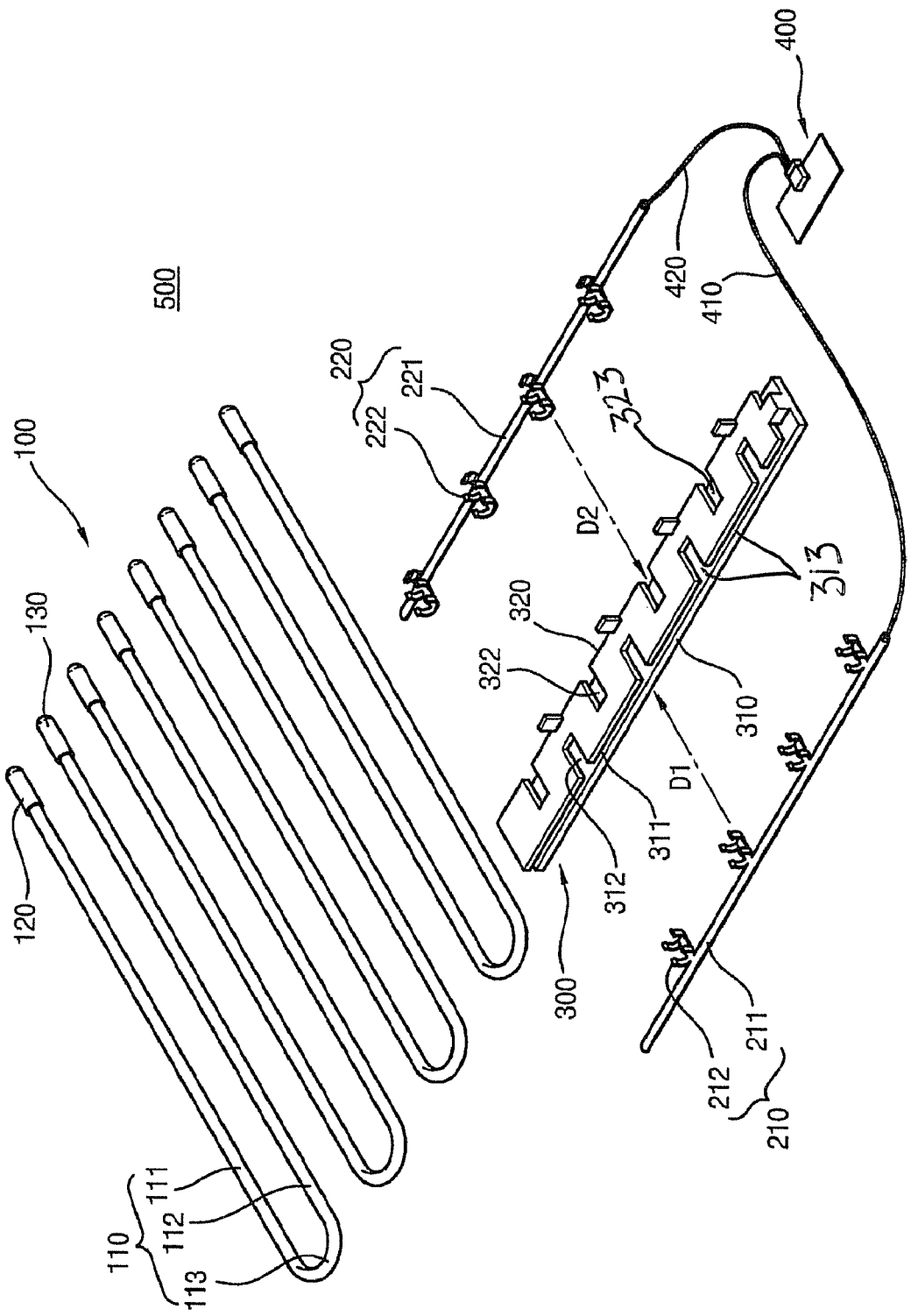
FIG. 1 is an exploded perspective view illustrating an exemplary embodiment of a backlight assembly according to the present invention.

It should be understood that the exemplary embodiments of the present invention described below may be varied and modified in many different ways without departing from the inventive principles disclosed herein, and the scope of the present invention is therefore not limited to these particular embodiments. Rather, these embodiments are provided so that this disclosure will be thorough and complete, and will fully convey the concept of the invention to those skilled in the art by way of example and not of limitation.

Hereinafter, the embodiments of the present invention will be described in detail with reference to the accompanied drawings. In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

Figure 2:
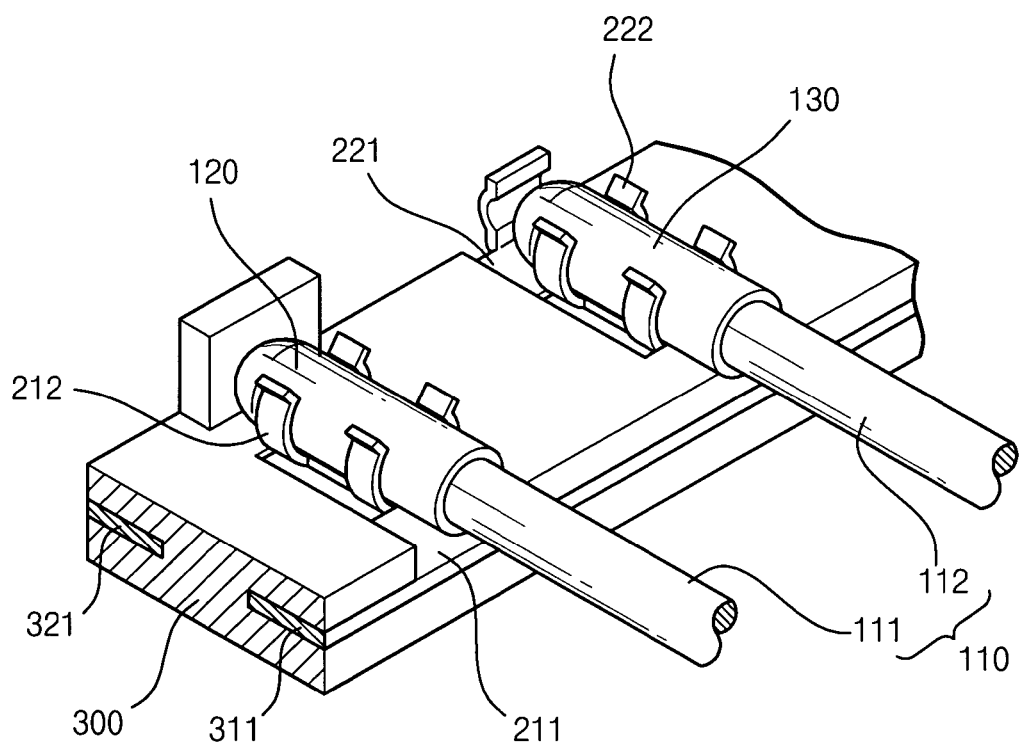
FIG. 2 is a perspective view illustrating a portion of the backlight assembly in FIG. 1.

FIG. 1 is an exploded perspective view illustrating an exemplary embodiment of a backlight assembly according to the present invention, and FIG. 2 is a perspective view illustrating a portion of the backlight assembly in FIG. 1.

Referring to FIGS. 1 and 2, a backlight assembly 500 includes a plurality of U-shaped lamps 100, a first electrode plate 210, a second electrode plate 220, a mold frame 300, and an inverter 400.

Each of the U-shaped lamps 100 includes a U-shaped lamp tube 110, a first external electrode 120, and a second external electrode 130. The U-shaped lamp tube 110 includes a first light-emitting portion 111, a second light-emitting portion 112, and a rounded portion 113. The first and second light-emitting portions 111 and 112 are extended along a first direction D1, and substantially in parallel with each other. The rounded portion 113 connects the first and second light-emitting portions 111 and 112 to each other. That is, the rounded portion 113 may be generally C-shaped, with a first end of the rounded portion 113 connected to the first light-emitting portion 111 and a second end of the rounded portion 113 connected to the second light-emitting portion 112.

The first external electrode 120 covers a first end portion of the first light-emitting portion 111, and the second external electrode 130 covers a first end portion of the second light-emitting portion 112. The first end portion of the first light-emitting portion 111 may correspond to a first end of the U-shaped lamp tube 110 and the first end portion of the second light-emitting portion 112 may correspond to a second end of the U-shaped lamp tube 110. The second end portion of the first light-emitting portion 111 is connected to the first end of the rounded portion 113 and the second end portion of the second light-emitting portion 112 is connected to the second end of the rounded portion 113.

The first electrode plate 210 includes a first base substrate 211 and a plurality of first clips 212. The first base substrate 211 is extended along a third direction that is substantially perpendicular to the first direction D1. In other words, a longitudinal direction corresponding to a longitudinal axis of the first base substrate 211 is substantially perpendicular to a longitudinal direction corresponding to longitudinal axes of the first and second light-emitting portions 111 and 112. The first clips 212 are upwardly protruded and combined with the first end portion of the first light-emitting portion 111, so that the first light-emitting portion 111 is fixed relative to the first electrode plate 210 within the backlight assembly 500. The first clips 212 are spaced apart from each other by a distance substantially equal to a distance between first light emitting portions 111 of adjacent U-shaped lamps 100. In the illustrated embodiment, the first clips 212 include a clip supporting prong extending perpendicularly to the first base substrate 211 and two lamp-holding members, although more or less lamp holding members would be within the scope of the first clips 212. The lamp-holding members are generally C-shaped where an opening of the C-shape is less than a diameter of the first light-emitting portion 111. The lamp holding members may be spring biased C-Shaped clips such that the opening of the lamp-holding members may be expanded for receiving the first light-emitting portion 111, and may be biased back to enclose the first light-emitting portion 111 therein. While a particular exemplary embodiment of the first clips 212 is illustrated, it should be understood that alternate embodiments of the first clips 212 would be within the scope of the first electrode plate 210.

The second electrode plate 220 includes a second base substrate 221 and a plurality of second clips 222 that may be similar to the first clips 212. The second base substrate 221 is extended along the third direction that is substantially perpendicular to the first direction D1. In other words, a longitudinal direction corresponding to a longitudinal axis of the second base substrate 221 is substantially perpendicular to a longitudinal direction corresponding to longitudinal axes of the first and second light-emitting portions 111 and 112. The second clips 222 are upwardly protruded and combined with the first end portion of the second light-emitting portion 112, so that the second light-emitting portion 112 is fixed relative to the second electrode plate 220 within the backlight assembly 500. The second clips 222 are spaced apart from each other by a distance substantially equal to a distance between second light emitting portions 112 of adjacent U-shaped lamps 100, and each of the second clips 222 is spaced apart from one of the first clips 212 adjacent to the each of the second clips 222. That is, in an assembled condition, the first clips 212 and the second clips 222 are alternatingly arranged within the backlight assembly 500, since the first and second light emitting portions 111, 112 alternate within the backlight assembly 500.

The first and second clips 212 and 222 fix the U-shaped lamps 100 relative to the first and second electrode plates 210, 220 within the backlight assembly 500. A first driving voltage and a second driving voltage are applied to the first and second external electrodes 120 and 130 through the first and second clips 212 and 222, respectively.

The inverter 400 outputs the first and second driving voltages. The inverter 400 is electrically connected to the first and second electrode plates 210 and 220 through a first wire and a second wire 410 and 420, respectively. The first driving voltage applied to the first electrode plate 210 is applied to the first external electrodes 120 through the first clips 212, and the second driving voltage applied to the second electrode plate 220 is applied to the second external electrodes 130 through the second clips 222, so that the U-shaped lamps 100 emit light in response to the first and second driving voltages.

In one exemplary embodiment, the first driving voltage corresponds to a reference voltage (for example, a ground voltage), and the second driving voltage corresponds to an alternating voltage alternating with respect to the reference voltage. Alternatively, both of the first and second driving voltages may be alternating voltages having an opposite phase with each other.

The mold frame 300 has, for example, a rectangular plate, although alternate shapes of the mold frame 300 would be within the scope of these embodiments. The mold frame 300 receives the first and second electrode plates 210 and 220. The mold frame 300 includes a dielectric material, so that the mold frame 300 electrically insulates the first and second electrode plates 210 and 220 from each other.

The mold frame 300 includes first and second combining portions 313 and 323. The first combining portion 313 includes a first slit 311, extending along a longitudinal direction of the mold frame 300, for receiving the first base substrate 211. The second combining portion 323 includes a second slit 321, extending along a longitudinal direction of the mold frame 300, for receiving the second base substrate 221. The first slit 311 is formed at a first side face 310 of the mold frame 300, and the second slit 321 is formed at a second side face 320. The first and second side faces 310 and 320 are opposite to each other and may be parallel to each other. The first electrode plate 210 is inserted into the first slit 311 of the first combining portion 313 by sliding along the first direction D1, and the second electrode plate 220 is inserted into the second slit 321 of the second combining portion 323 by sliding along the second direction D2 that is opposite to the first direction D1.

The first and second combining portions 313 and 323 also includes a plurality of first openings 312 and a plurality of second openings 322, respectively. First portions of the mold frame 300, which are disposed over the first slit 311, may be removed to form the first openings 312, respectively, and second portions of the mold frame 300, which are disposed over the second slit 321, may be removed to form the second openings 322, respectively. Alternatively, the mold frame 300 may be manufactured without material in the areas corresponding to the first openings 312 and the second openings 322. The first clips 212 of the first electrode plate 210 are disposed at the first openings 312, respectively, when the first base substrate 211 is inserted into the first slit 311, and the second clips 222 of the second electrode plate 220 are disposed at the second openings 322, respectively, when the second base substrate 221 is inserted into the second slit 321. In the illustrated embodiment, the clip supporting prong of each of the first and second clips 212, 222 is received within the first and second openings 312, 322, respectively, and the lamp holding members of each of the first and second clips 212, 222 extend upwardly away from the clip supporting prongs and outwardly from the first and second openings 312, 322, respectively.

According to these embodiments, the U-shaped lamps 100 receive the first and second driving voltages from one inverter 400 through the first and second electrode plates 210 and 220 and thus productivity is enhanced since a plurality of inverters is not required.

Furthermore, the first and second wires 410 and 420 are disposed only at the first end portions of the first and second light-emitting portions 111 and 112 of the U-shaped lamps 100, and therefore interference between the U-shaped lamps 100 and the first and second wires 410 and 420 is reduced.

Figure 3:
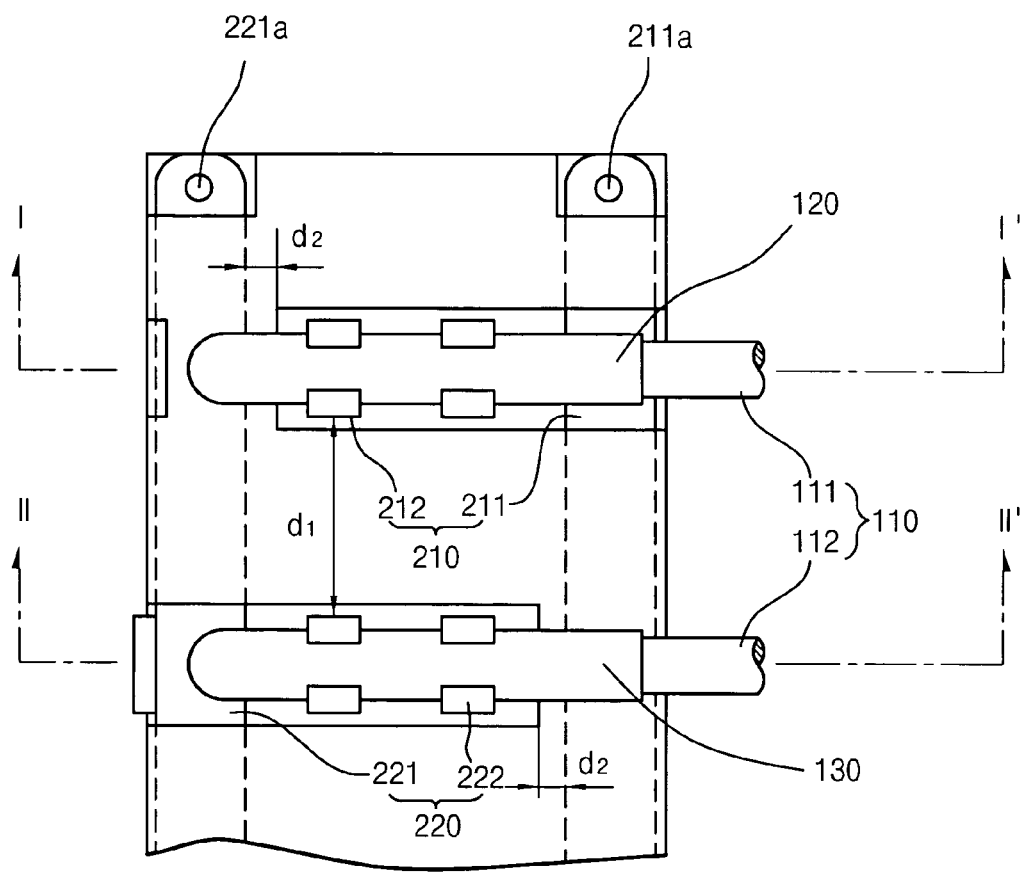
FIG. 3 is a plan view illustrating the portion of the backlight assembly in FIG. 2.

FIG. 3 is a plan view illustrating the portion of the backlight assembly in FIG. 2.

Referring to FIG. 3, each of the first clips 212 formed at the first electrode plate 210 is adjacent to each of the second clips 222 formed at the second electrode plate 220. In other words, each of the first clips 212 and each of the second clips 222 alternate with each other. The first light-emitting portion 111 of the U-shaped lamp 100 is combined with the first clip 212, and the second light-emitting portion 112 of the U-shaped lamp 100 is combined with the second clip 222. Therefore, the first external electrode 120 formed at the first end portion of the first light-emitting portion 111 is electrically connected to the first clip 212, and the second external electrode 130 formed at the first end portion of the second light-emitting portion 112 is electrically connected to the second clip 222.

The first electrode plate 210 includes a first hole 211a. The first hole 211a is formed at a first end portion of the first base substrate 211. The second electrode plate 220 includes a second hole 221a. The second hole 221a is formed at a first end portion of the second base substrate 221. The first end portion of the first base substrate 211 and the first end portion of the second base substrate 221 may be adjacent to a first end of the mold frame 300. The first and second wires 410 and 420 may be electrically connected to the first and second electrode plates 210 and 220 through screws (not shown) inserted into the first and second holes 211a and 221a, respectively. Thus, the wires 410 and 420 both extend and are connected to the first end of the mold frame 300.

One of the first clips 212 is spaced apart from one of the second clips 222, which is adjacent to the one of the first clips 212, by a first distance d1. In exemplary embodiments, the first distance d1 is in a range from about 10 mm to about 50 mm. In order to enhance luminance of the backlight assembly, reducing a distance between the first and second light-emitting portions 111 and 112 is preferable. However, when the distance between the first and second light-emitting portions 111 and 112 is less than about 10 mm, a bright line may be generated on a display screen. Therefore, in order to prevent such a bright line from occurring, the first distance d1 is, in the exemplary embodiments described herein, in the range from about 10 mm to about 50 mm.

A second distance d2 corresponds to a shortest distance between the first electrode plate 210 and the second electrode plate 220. The second distance d2 can be measured from a free end of a clip-supporting prong of the first electrode plate 210 to the second base substrate 221. The second distance d2 can also be measured from a free end of a clip-supporting prong of the second electrode plate 220 to the first base substrate 211. The second distance d2 is at least about 2 mm. When the shortest distance between the first electrode plate 210 and the second electrode plate 220 is less than about 2 mm, an interference between the first electrode plate 210 and the second electrode plate 220 is induced.

Figure 4:
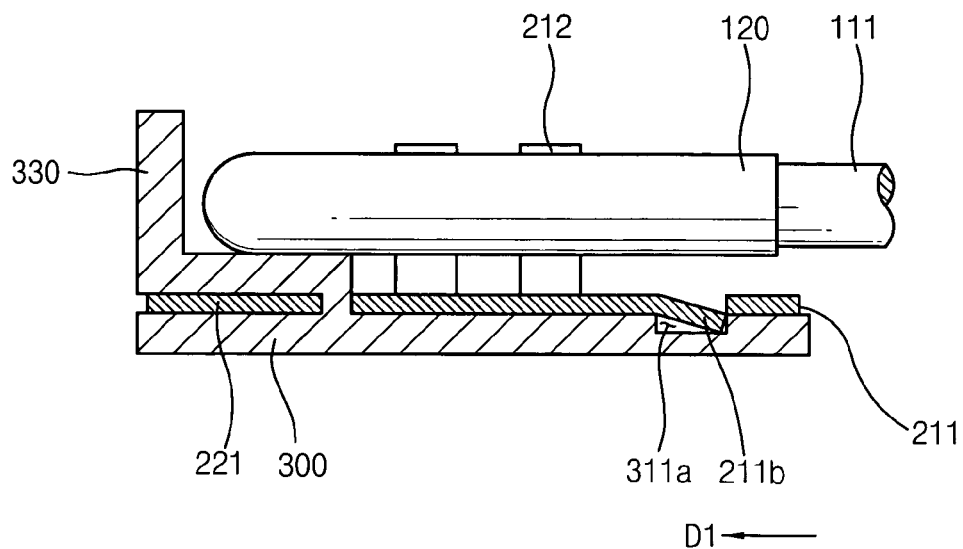
FIG. 4 is a cross-sectional view taken along line I-I' in FIG. 3.
Figure 5:
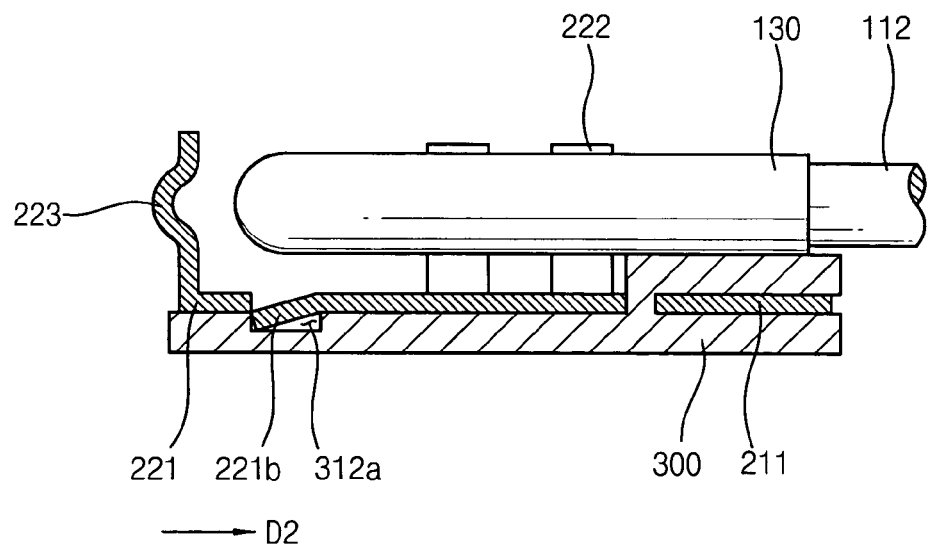
FIG. 5 is a cross-sectional view taken along line II-II' in FIG. 3.

FIG. 4 is a cross-sectional view taken along line I-I' in FIG. 3, and FIG. 5 is a cross-sectional view taken along line II-II' in FIG. 3.

Referring to FIGS. 4 and 5, the mold frame 300 includes a first blocking protrusion 330. The first blocking protrusion 330 protrudes upwardly from an upper face of the mold frame 300. The first blocking protrusion 330 blocks the first end portion of the first light-emitting portion 111 of the U-shaped lamp tube 110 to prevent the first end portion of the first light-emitting portion 111 from moving along the first direction D1 in FIG. 1. A height of the first blocking protrusion 330 is sufficient for preventing longitudinal movement of the first light-emitting portion 111, and, as illustrated, may be greater than a diameter of the first light-emitting portion 111.

The second electrode plate 220 includes a second blocking protrusion 223. The second blocking protrusion 223 protrudes upwardly from the second base substrate 221. The second blocking protrusion 223 blocks the first end portion of the second light-emitting portion 112 of the U-shaped lamp tube 110 to prevent the first portion of the second light-emitting portion 112 from moving along the first direction D1 in FIG. 1. A height of the second blocking protrusion 223 is sufficient for preventing longitudinal movement of the second light-emitting portion 112, and, as illustrated, may be substantially equivalent to a height of a lamp holding member of the second clips 222. In one embodiment, the second clips 222 extend from a first side of the second base substrate 221 and the second blocking protrusions 223 extend from a second side of the second base substrate 221.

In the present embodiment, the first and second blocking protrusions 330 and 223 are formed at the mold frame 300 and the second electrode plate 210, respectively. Alternatively, both of the first and second blocking protrusions 330 and 223 may be formed at the second electrode plate 210. In either embodiment, both the first and second blocking protrusions 330, 223 are positioned relative to the second side face 320 of the mold frame 300.

The first electrode plate 210 further includes a first fixing protrusion 211b. A portion of the first base substrate 211 of the first electrode plate 210 is cut and bent downward to form the first fixing protrusion 211b. The second electrode plate 220 further includes a second fixing protrusion 221b. A portion of the second base substrate 221 of the second electrode plate 220 is cut and bent downward to form the second fixing protrusion 221b.

The mold frame 300 further includes a first fixing recession 311a corresponding to the first fixing protrusion 211b. The first fixing recession 311a is formed at a first face of the mold frame 300 that makes contact with the first base substrate 211 when the first electrode plate 210 is inserted into the first slit 311. The first electrode plate 210 is fastened to the mold frame 300 due to the first fixing protrusion 211b and the first fixing recession 311a.

The mold frame 300 further includes a second fixing recession 312a corresponding to the second fixing protrusion 221b. The second fixing recession 312a is formed at a second face of the mold frame 300 that makes contact with the second base substrate 221 when the second electrode plate 220 is inserted into the second slit 321. The second electrode plate 220 is fastened to the mold frame 300 due to the second fixing protrusion 221b and the second fixing recession 312a. The first and second fixing protrusions 211b, 221b may be spring biased in the protruded direction such that the fixing protrusions 211b, 221b are compressed inwardly against their bias as the first and second base substrates 211, 221 are slid into the slits 311, 321, respectively, and are protruded back outwardly via spring bias as the fixing protrusions 211b, 221b are slid over the fixing recessions 211a and 312a, respectively.

While exemplary embodiments for fixing the first and second electrode plates 210, 220 to the mold frame 300 have been described, alternate embodiments, such as, but not limited to, screws, adhesive means, etc., for fixing the first and second electrode plates 210, 220 to the mold frame 300 would also be within the scope of these embodiments, although the illustrated embodiments allow for a simple one-step fixing process.

A shape of the first and second electrode plates 210 and 220 is not limited by FIGS. 1 through 5. The first and second electrode plates 210 and 220 may have various shapes that would also be within the scope of these embodiments.

Figure 6:
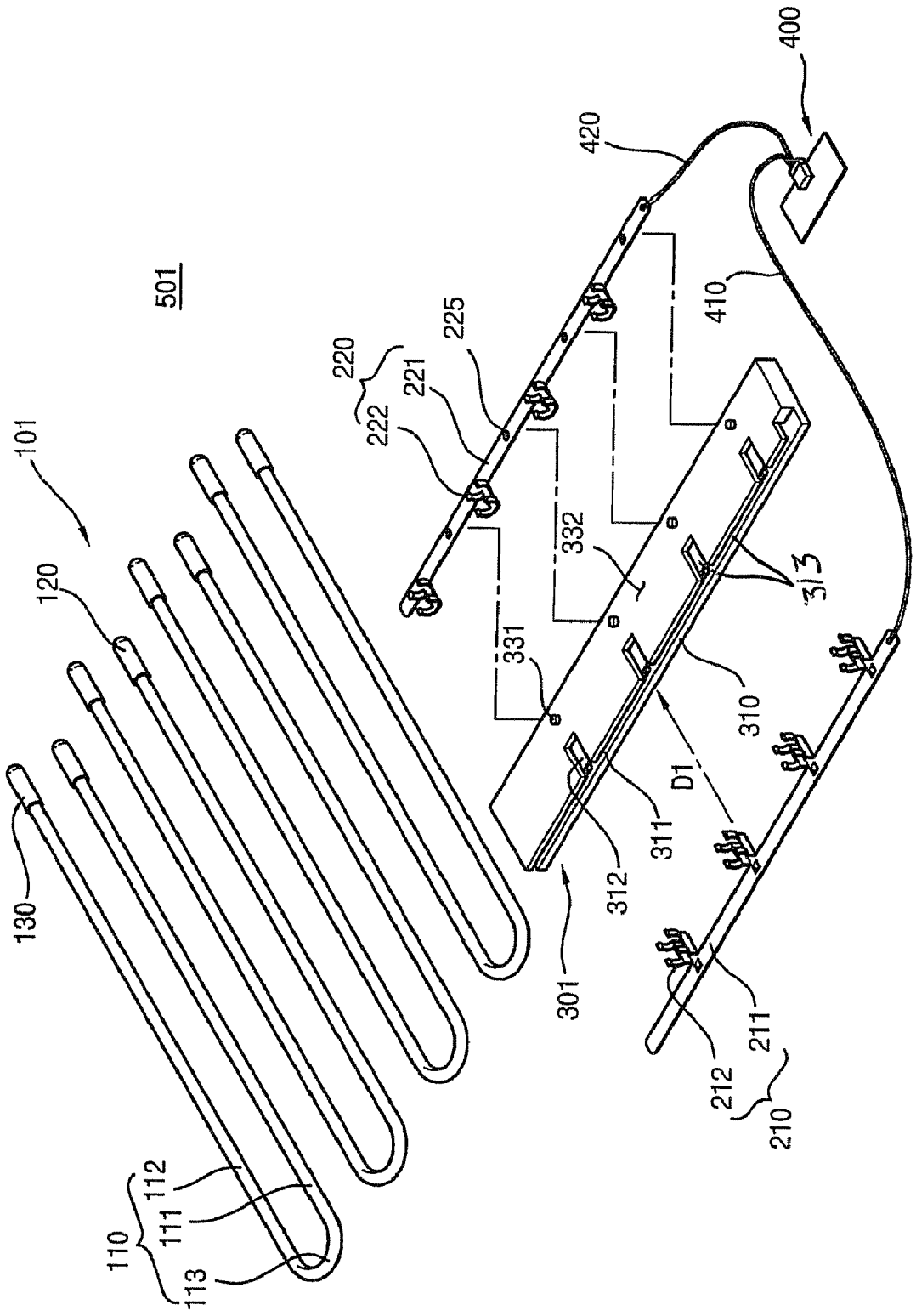
FIG. 6 is an exploded perspective view illustrating another exemplary embodiment of a backlight assembly according to the present invention.
Figure 7:
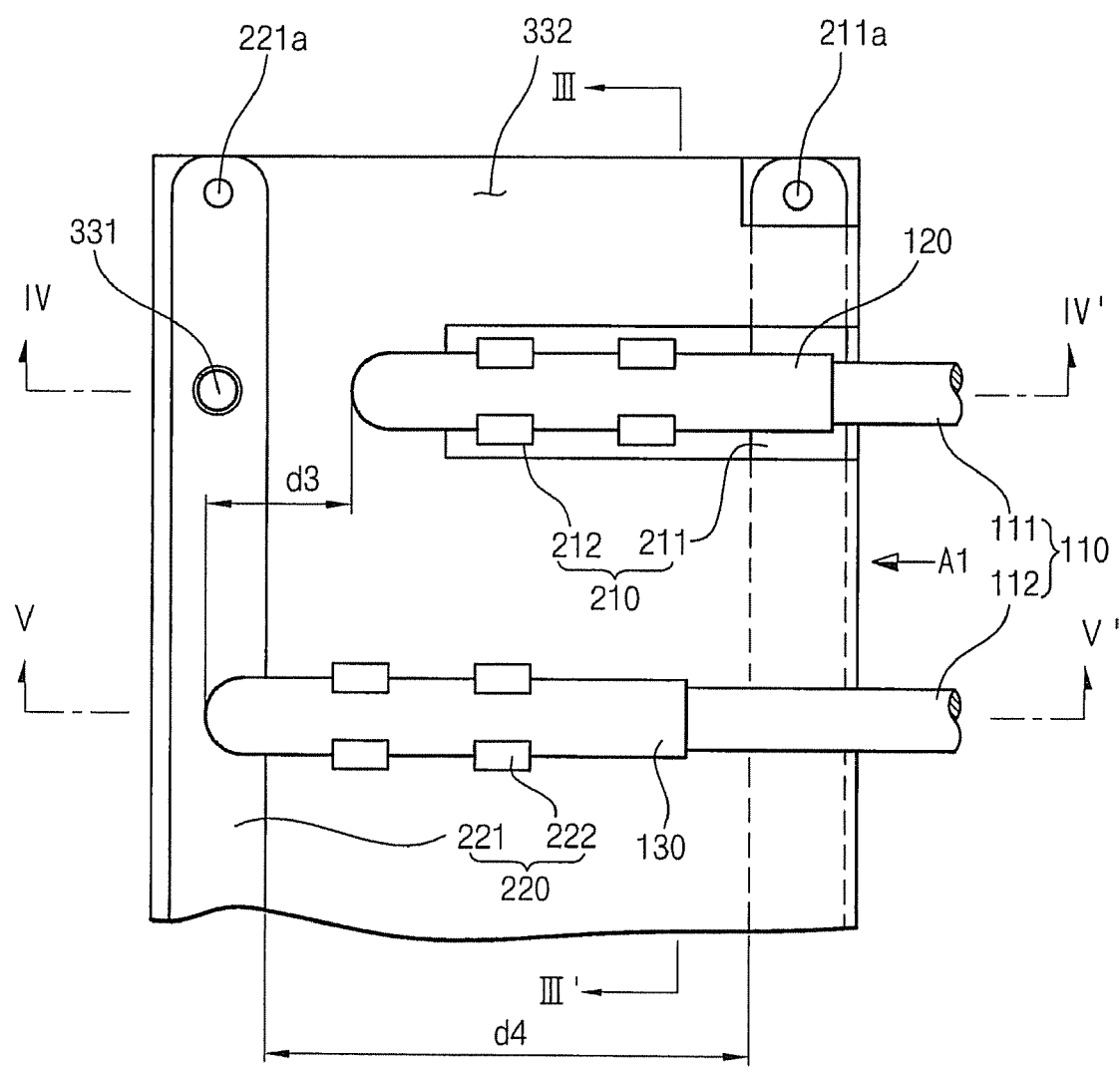
FIG. 7 is a plan view illustrating a portion of the backlight assembly in FIG. 6.

FIG. 6 is an exploded perspective view illustrating another exemplary embodiment of a backlight assembly according to the present invention, and FIG. 7 is a plan view illustrating a portion of the backlight assembly in FIG. 6.

Referring to FIGS. 6 and 7, a backlight assembly 501 includes a plurality of U-shaped lamps 101, a first electrode plate 210, a second electrode plate 220, a mold frame 301, and an inverter 400.

Each of the U-shaped lamps 101 includes a U-shaped lamp tube 110, a first external electrode 120, and a second external electrode 130. The U-shaped lamp tube 110 includes a first light-emitting portion 111, a second light-emitting portion 112, and a rounded portion 113. The first and second light-emitting portions 111 and 112 extend along a first direction D1, and are substantially parallel with each other. The rounded portion 113 connects the first and second light-emitting portions 111 and 112 to each other, similarly to the U-shaped lamps 100 of FIG. 1.

The first light-emitting portion 111 is shorter than the second light-emitting portion 112 by a third distance d3, such that a difference between a length of the second light-emitting portion 112 and a length of the first light-emitting portion 111 is equal to the third distance d3. In other words, the third distance d3 is measured from a line perpendicular to the longitudinal axis of the first light-emitting portion 111 at its first end portion to a line perpendicular to the longitudinal axis of the second light-emitting portion 112 at its first end portion.

Figure 8:
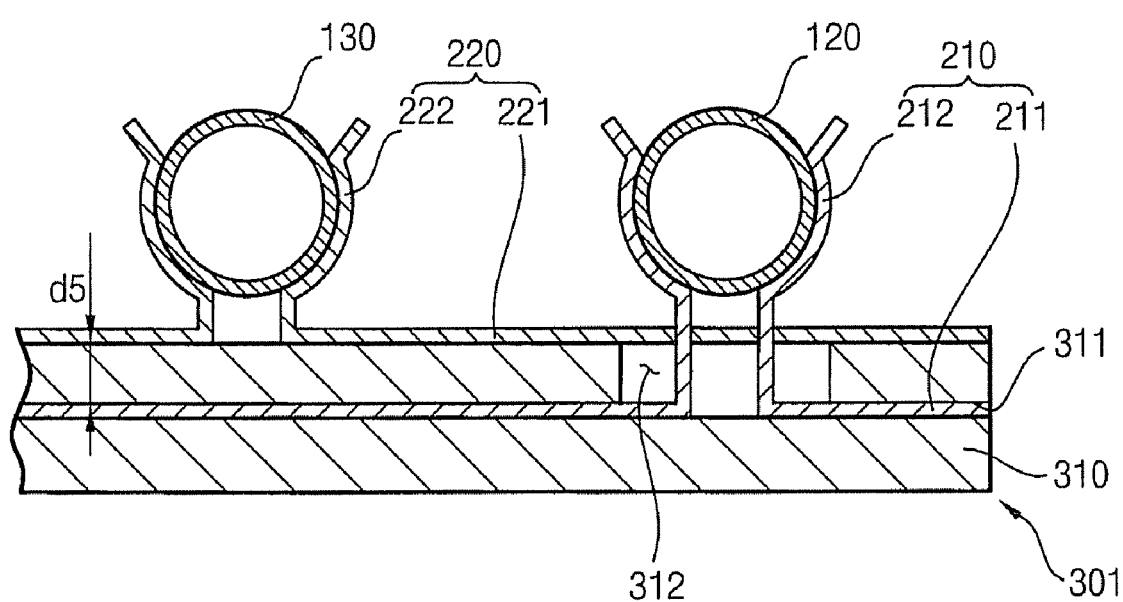
FIG. 8 is a cross-sectional view taken along line III-III' in FIG. 7.

FIG. 8 is a cross-sectional view taken along line III-III' in FIG. 7.

Referring to FIGS. 6 through 8, the mold frame 301 of the backlight assembly 501 includes a slit 311. The slit 311 is formed at a first side face 310. The first electrode plate 210 is inserted into the slit 311 by sliding the first base substrate 211 in the first direction D1. The mold frame 301 includes an opening 312. A portion of the mold frame 301 may be removed to form the opening 312. Alternatively, the mold frame 301 may be manufactured to be void of material in the area of opening 312. The opening 312 receives the first clip 212 and the first clip 212 is disposed at the opening portion 312.

Figure 9:
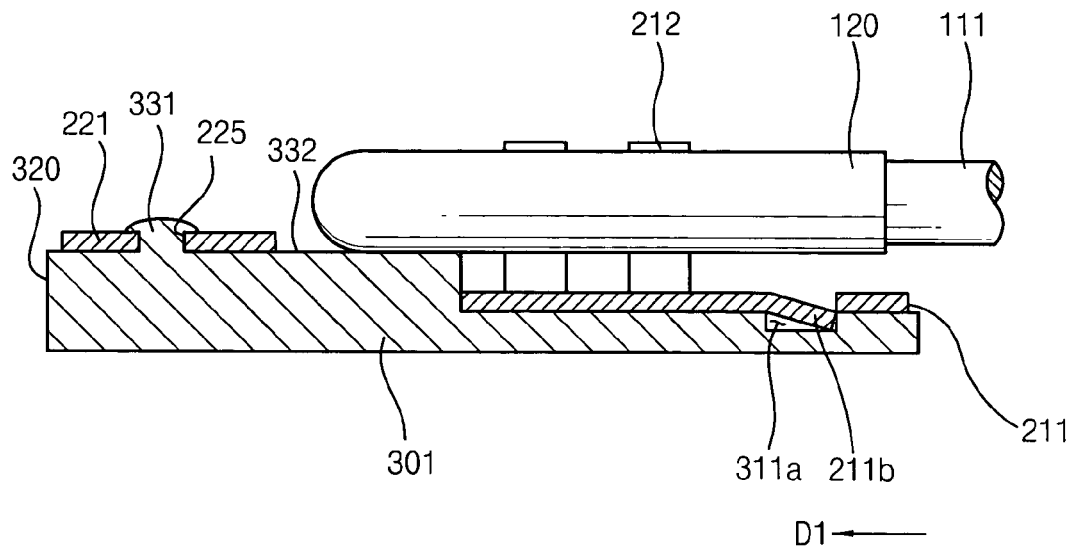
FIG. 9 is a cross-sectional view taken along line IV-IV' in FIG. 7.

FIG. 9 is a cross-sectional view taken along line IV-IV' in FIG. 7.

As shown in FIG. 9, the first electrode plate 210 further includes a first fixing protrusion 211b. A portion of the first base substrate 211 is cut and bent downward to form the first fixing protrusion 211b. Additionally, the mold frame 301 includes a first fixing recession 311a corresponding to the first fixing protrusion 211b. The first fixing recession 311a is formed at a first surface of the mold frame 301, which makes contact with the first base substrate 211. When the first electrode plate 210 is inserted into the slit 311 of the mold frame 301, the first electrode plate 210 is fastened to the mold frame 301 due to the first fixing protrusion 211b and the first fixing recession 311a.

Referring to FIGS. 6, 7 and 9, the second electrode plate 220 of the backlight assembly 501 is disposed on the mold frame 301. The second electrode plate 220 is adjacent to a second side face 320 that is opposite to the first side face 310. The mold frame 301 includes a boss 331 protruding upwardly in a direction towards the second electrode plate 220, and the second base substrate 221 includes a connection hole 225.

The boss 331 is inserted into the connection hole 225, so that a portion of the boss 331 is protruded from the connection hole 225. The protruded portion of the boss 331 may be heated and compressed in order to fasten the second base substrate 221 to the mold frame 301. Alternatively, the boss may be threaded or bulged and a nut or other fastening device may be secured over the second base substrate 221 onto the threaded or bulged boss. Other arrangements for fastening the second base substrate 221 onto the mold frame 301 would also be within the scope of these embodiments.

Referring to FIG. 7, when the first end portion of the first light-emitting portion 111 is spaced apart from the first end portion of the second light-emitting portion 112 by a third distance d3 measured along the first direction D1, the first base substrate 211 of the first electrode plate 210 may be spaced apart from the second base substrate 221 of the second electrode plate 220 by a fourth distance d4 measured along the first direction D1. Similarly, a distance between a free end of the clip supporting prong of the clip 212 and the second base substrate 221 and a distance between a free end of the clip supporting prong of the clip 222 and the first base substrate 211 each define a distance that may be greater than the distance d2 previously described with respect to FIG. 3. As a result, the first and second electrode plates 210 and 220 are spaced apart, so that interference between the first and second electrode plates 210 and 220 is further reduced.

Figure 10:
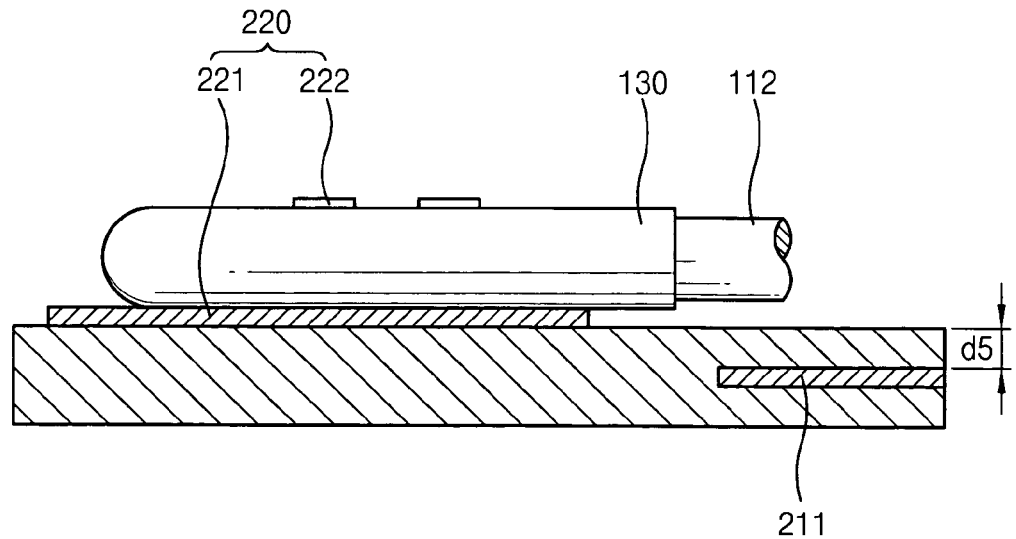
FIG. 10 is a cross-sectional view taken along line V-V' in FIG. 7.

FIG. 10 is a cross-sectional view taken along line V-V' in FIG. 7.

Referring to FIG. 10, and with further reference to FIG. 8, the first electrode plate 210 of the backlight assembly 501 is inserted into the slit 311 disposed at a center portion between an upper face 332 and a lower face 334 adjacent the first side face 310 of the mold frame 301, so that the first electrode plate 210 is disposed at the center portion between the upper and lower faces 332, 334. On the other hand, the second electrode plate 220 is disposed on the upper face 332 of the mold frame 301.

Therefore, the first base substrate 211 of the first electrode plate 210 and the second base substrate 221 of the second electrode plate 220 are spaced apart by a fifth distance d5 along a vertical direction extending from the slit 311 to the upper face 332, so that interference between the first and second electrode plates 210 and 220 is further reduced.

Figure 11:
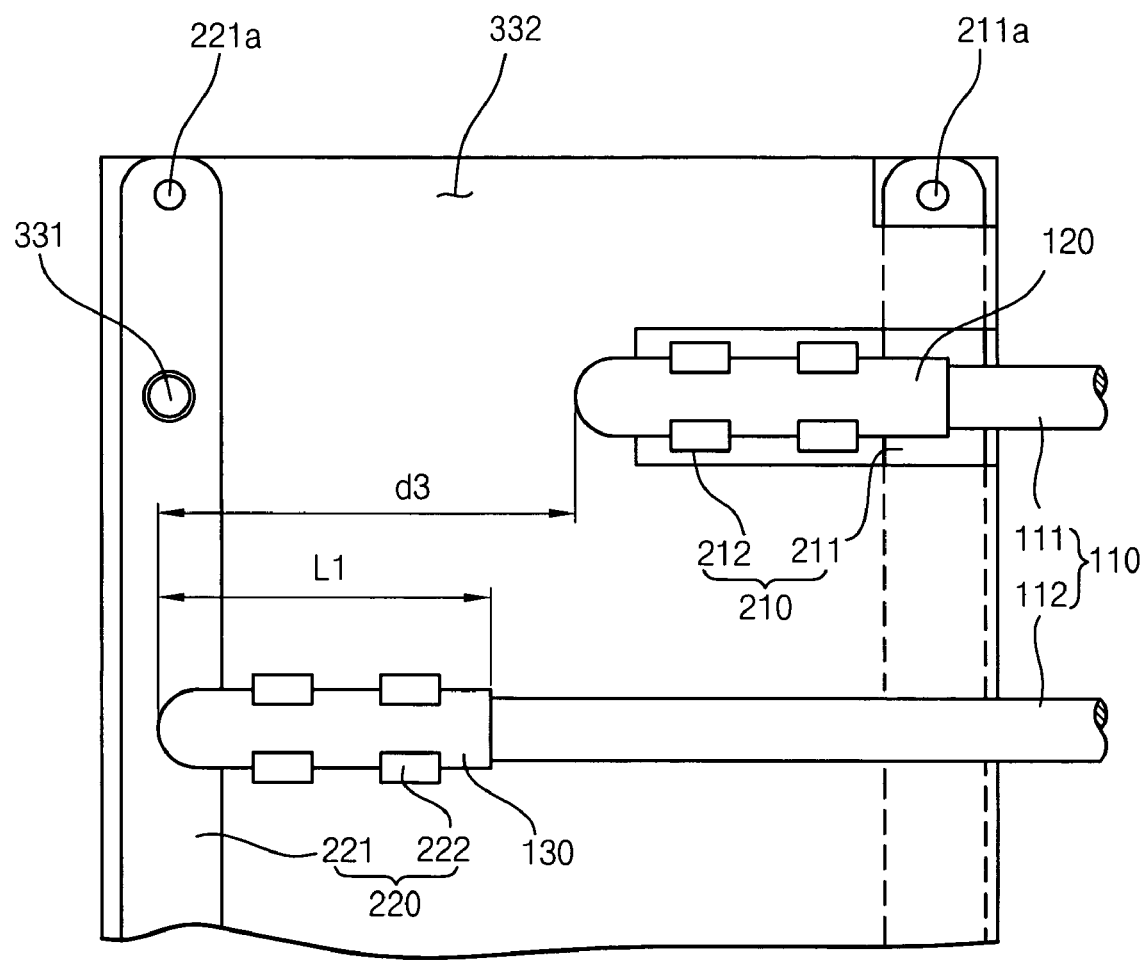
FIG. 11 is a plan view illustrating another exemplary embodiment of a backlight assembly according to the present invention.

FIG. 11 is a plan view illustrating another exemplary embodiment of a backlight assembly according to the present invention.

Referring to FIG. 11, a U-shaped lamp 101 of the backlight assembly includes a U-shaped lamp tube 110, a first external electrode 120, and a second external electrode 130. The U-shaped lamp tube 110 generates light. Each U-shaped lamp tube 110 includes a first light-emitting portion 111, a second light-emitting portion 112 extended in parallel with the first light-emitting portion 111, and a rounded portion 113 connecting second end portions of the first and second light-emitting portions 111 and 112.

The first light-emitting portion 111 is shorter than the second light-emitting portion 112, so that the first end of the first light-emitting portion 111 and the first end of the second light-emitting portion 112 are spaced apart from each other by a third distance d3, where the third distance d3 is a difference between a length of the second light-emitting portion 112 and a length of the first light-emitting portion 111.

The first external electrode 120 covers the first end portion of the first light-emitting portion 111. The second external electrode 130 covers the first end portion of the second light-emitting portion 112.

The third distance d3 in the illustrated embodiment is larger than a length L1 of the first or second external electrode 120 or 130. Therefore, the first and second external electrodes 120 and 130 do not overlap each other. Therefore, the first and second external electrodes 120 and 130 are sufficiently spaced apart for further reducing interference between the first and second external electrodes 120 and 130.

Figure 12:
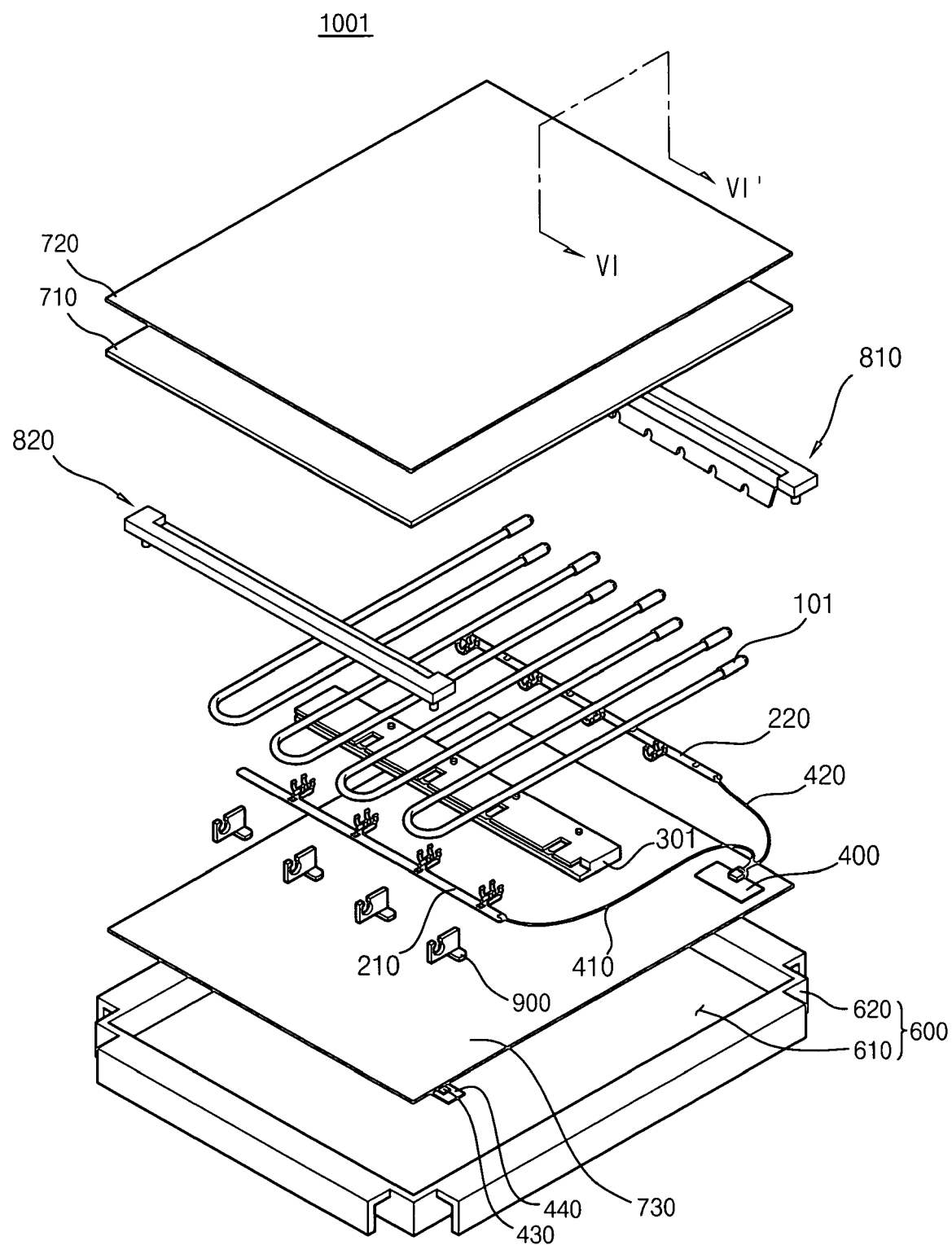
FIG. 12 is an exploded perspective view illustrating another exemplary embodiment of a backlight assembly according to the present invention.
Figure 13:
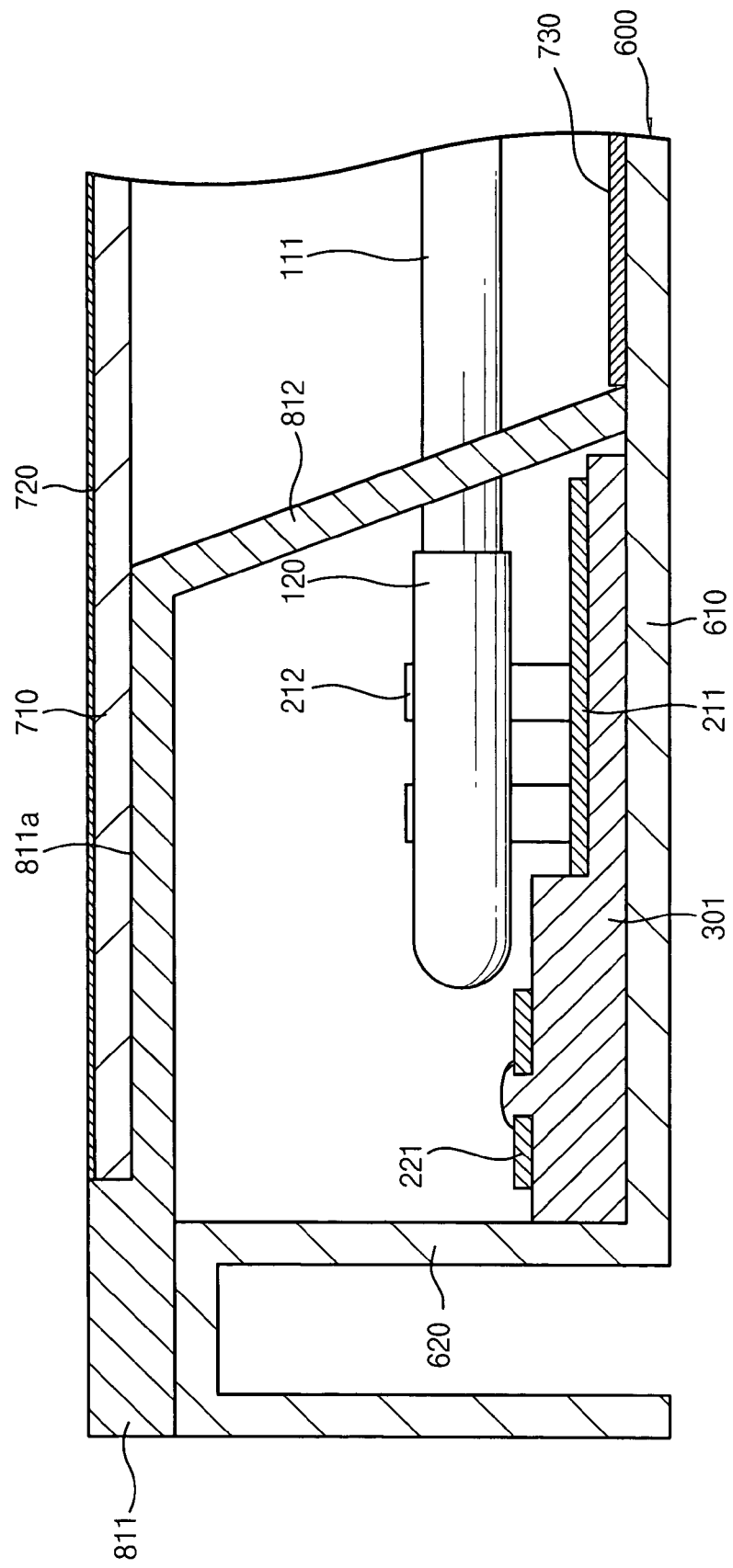
FIG. 13 is a cross-sectional view taken along line VI-VI' in FIG. 12.

FIG. 12 is an exploded perspective view illustrating another exemplary embodiment of a backlight assembly according to the present invention, and FIG. 13 is a cross-sectional view taken along line VI-VI' in FIG. 12. The same reference numerals will be used to refer to the same or like parts in FIGS. 12 and 13 as those described in FIG. 6, and any repetitive explanation concerning the above elements will be omitted.

Referring to FIGS. 12 and 13, the backlight assembly 1001 includes a plurality of U-shaped lamps 101, a first external electrode plate 210, a second external electrode plate 220, a mold frame 301, an inverter 400 and a receiving container 600.

The receiving container 600 includes a bottom plate 610 and a sidewall 620 extended from edges of the bottom plate 610 to define a receiving space for receiving the U-shaped lamps 101, the first and second electrode plates 210 and 220, and the mold frame 301. The inverter 400 may be disposed at a backside of the bottom plate 610.

The backlight assembly 1001 further includes a light-diffusing plate 710 and an optical sheet 720. The light-diffusing plate 710 is disposed over the U-shaped lamps 101, and the optical sheet 720 is disposed over the light-diffusing plate 710. The light-diffusing plate 710 and the optical sheet 720 enhance luminance uniformity and viewing angle of light generated by the U-shaped lamps 101. A distance between a center of the first light-emitting portion 111, such as defined by its longitudinal axis, and a center of the second light-emitting portion 112, such as defined by its longitudinal axis, is substantially equal to or less than three times a distance between the U-shaped lamps 101 and the light-diffusing plate 710.

The backlight assembly 1001 further includes a light-reflecting plate 730. The light-reflecting plate 730 is disposed between the U-shaped lamps 101 and the bottom plate 610 of the receiving container 600. The light-reflecting plate 730 reflects light generated by the U-shaped lamps 101 toward the light-diffusing plate 710 to enhance light-using efficiency.

The backlight assembly 1001 further includes a first mold cover 810 and a second mold cover 820. The first mold cover 810 covers the first end portions of the first and second light-emitting portions 111, 112 of the U-shaped lamps 101, and the second mold cover 820 covers the rounded portions 113 of the U-shaped lamps 101.

Figure 14:
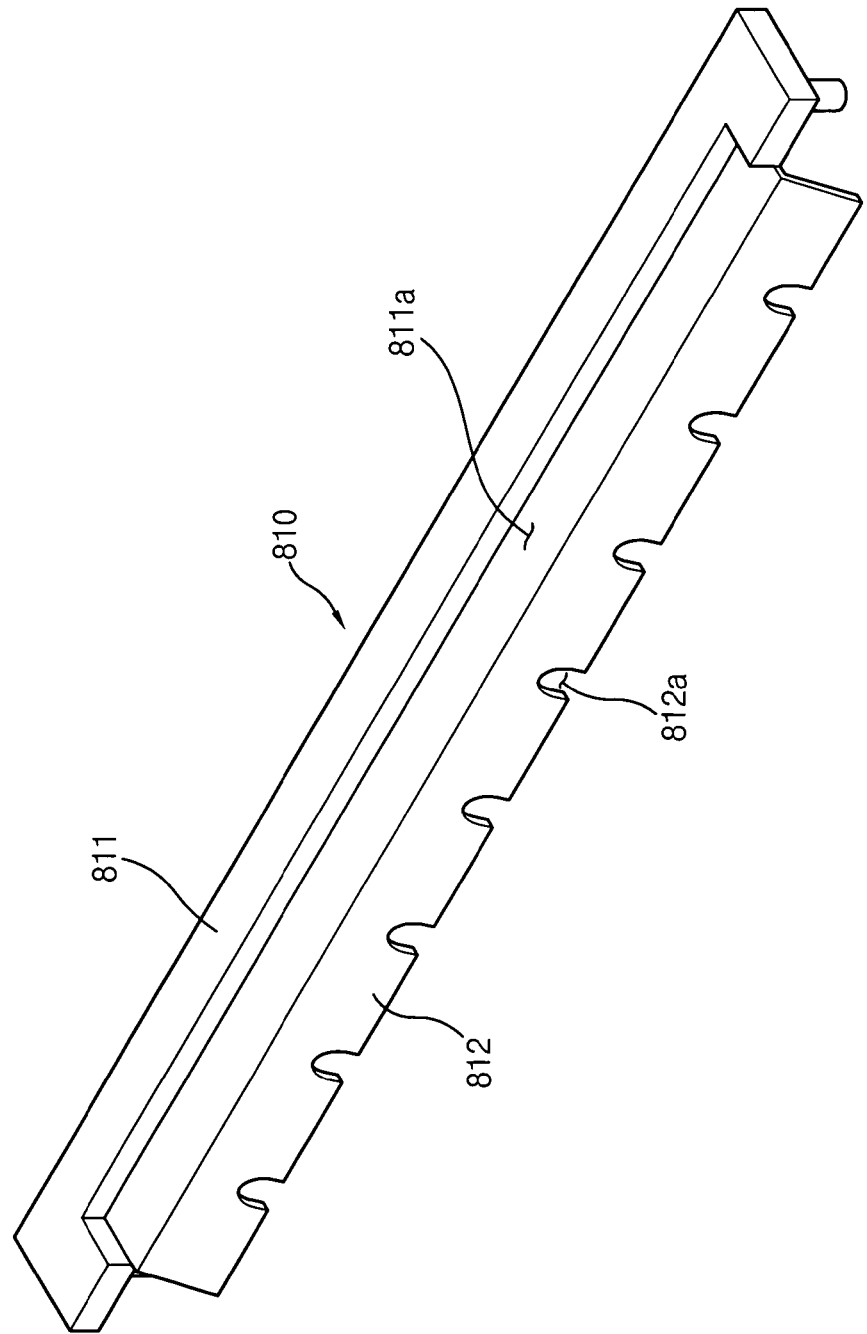
FIG. 14 is a perspective view illustrating a first mold cover in FIG. 12.

FIG. 14 is a perspective view illustrating a first mold cover 810 in FIG. 12. The second mold cover 820 in FIG. 12 is substantially identical with the first mold cover 810, so that any repetitive explanation about the second mold cover 820 will be omitted.

Referring to FIGS. 13 and 14, the first mold cover 810 includes an upper face 811 and an inclined face 812. In an assembled condition, as shown in FIG. 13, the upper face 811 may rest upon a sidewall 620 of the receiving container 600, and the inclined face 812 may extend towards the bottom plate 610 of the receiving container 600. The upper face 811 is substantially parallel with the bottom plate 610 of the receiving container 600. The inclined face 812 is downwardly extended from the upper face 811 such that a vertical angle between the upper face 811 and the inclined face 812 is obtuse. The inclined face 812 includes a plurality of receiving holes 812a for receiving the U-shaped lamps 101. The first mold cover 810 covers an ineffective light-emitting region of the U-shaped lamps 101, and therefore does not interfere with light transmittance.

The upper face 811 of the first mold cover 810 includes a stepped portion 811a for guiding a position of the light-diffusing plate 710 and the optical sheet 720. The inclined face 812 extends from an end of the stepped portion 811a.

Referring again to FIG. 12, the backlight assembly 1001 further includes a plurality of fixing members 900. The fixing members 900 will be further explained below with reference to FIGS. 15 and 16.

The backlight assembly 1001 further includes a plurality of sensors 430 and a circuit board 440. The sensors 430 and the circuit board 440 will be further explained below with reference to FIG. 17.

Figure 15:
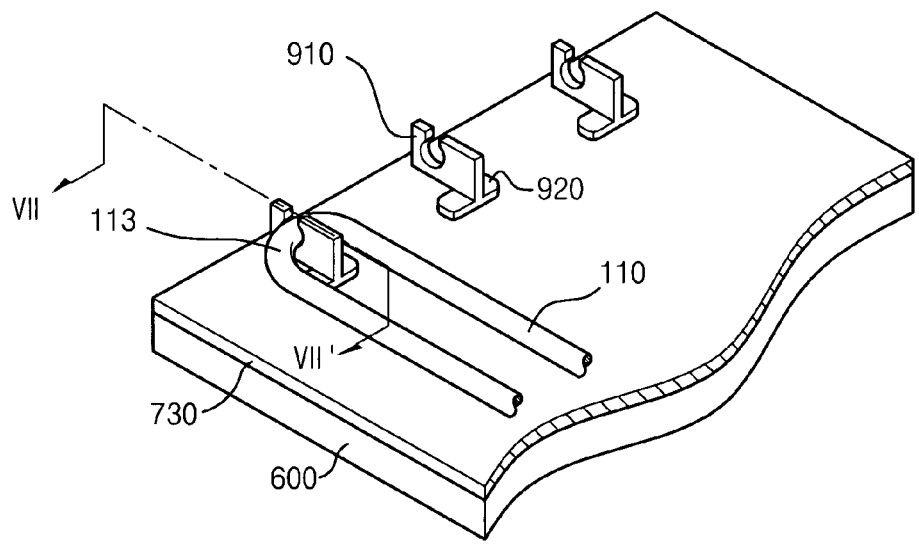
FIG. 15 is a perspective view illustrating a fixing member in FIG. 12.
Figure 16:
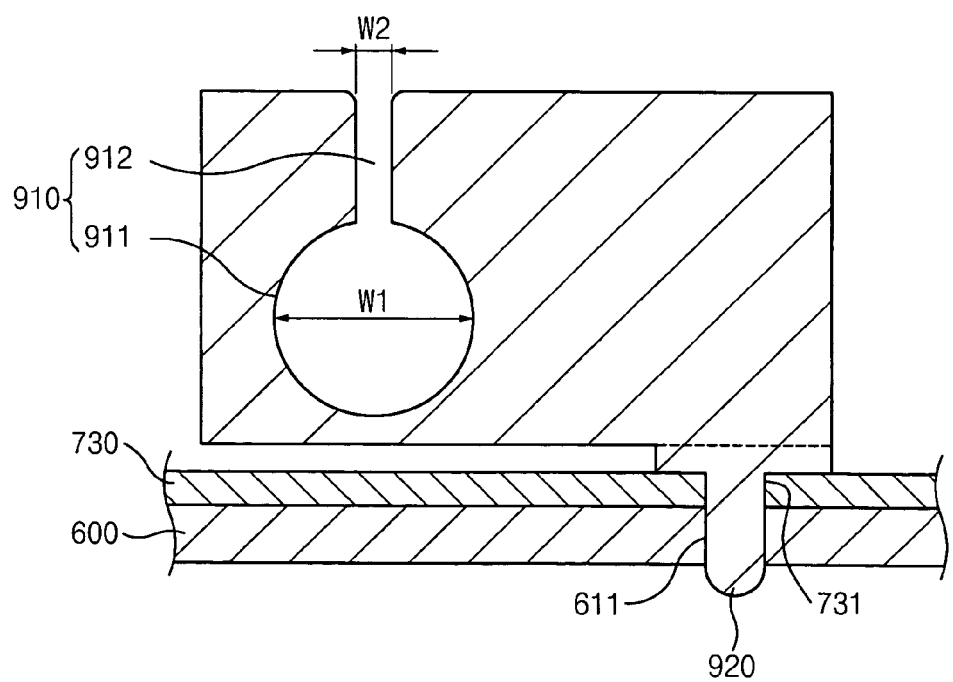
FIG. 16 is a cross-sectional view taken along a line VII-VII' in FIG. 15.

FIG. 15 is a perspective view illustrating a fixing member 900 in FIG. 12, and FIG. 16 is a cross-sectional view taken along line VII-VII' in FIG. 15.

Referring to FIGS. 15 and 16, each of the fixing members 900 includes a supporting portion 910 for supporting the U-shaped lamps 100 or 101 and a fixing portion 920 for fastening the fixing member 900 to the light-reflecting plate 730 and the bottom plate 610 of the receiving container 600. The supporting portion 910 includes an opening 911 having a diameter w1, and a channel 912 having a width w2. The rounded portion 113 of the U-shaped lamp 100 is inserted into the opening 911 through the channel 912. The diameter w1 of the opening 911 is substantially same as a diameter of the round portion 113 of the U-shaped lamp tube 110, and the width w2 of the channel 912 is smaller than the diameter w1 of the opening 911.

When the rounded portion 113 of the U-shaped lamp tube 110 is inserted into the opening 911 through the channel 912, the U-shaped lamp tube 110 of the U-shaped lamps 100 or 101 is fastened to the supporting portion 910.

The supporting portion 910 includes an elastic material, so that when the rounded portion 113 of the U-shaped lamp tube 110 passes through the channel 912, the channel 912 dehisces. In other words, the channel 912 expands such that the width w2 increases for allowing passage of the rounded portion 113 therethrough. The channel 912 may contract, and thus the width w2 may return to its prior width, after the rounded portion 113 is seated within the opening 911.

The supporting portion 910 protrudes from the fixing portion 920. The fixing portion 920 is inserted into the first and second through holes 731 and 611 formed at the light-reflecting plate 730 and the receiving container 600, respectively. The fixing portion 920 may include a flat stabilizing portion for lying substantially flush with a surface of the receiving container 600 and an attachment prong extending downwardly, in an opposite direction of the supporting portion 910, from the flat stabilizing portion. Alternatively, the fixing portion 920 may include only the attachment prong. A diameter of attachment prong of the fixing portion 920 is slightly greater than a diameter of the first and second through holes 731 and 611, so that the fixing portion 920 is tightly fastened to the light-reflecting plate 730 and the receiving container 600. While an exemplary attachment arrangement is illustrated and described, other means and devices for attaching the fixing portion 920 to the receiving container 600 would be within the scope of these embodiments.

The fixing member 900 may have various shapes, and is therefore not limited to the illustrated embodiment, but instead may be designed to best accommodate various lamp tube designs and backlight assemblies.

Figure 17:
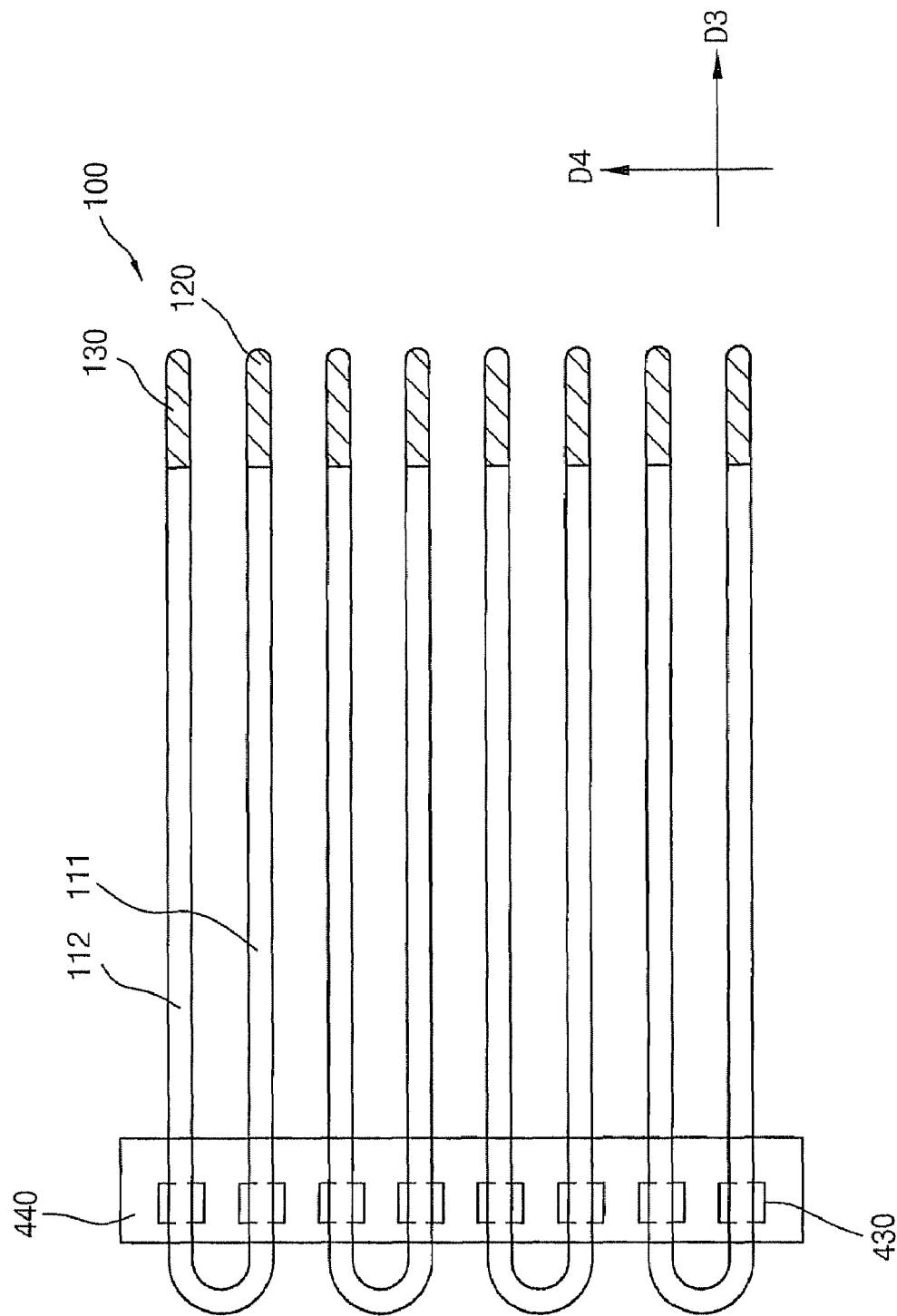
FIG. 17 is a plan view illustrating a connection between a sensor and a U-shaped lamp.

FIG. 17 is a plan view illustrating a connection between a sensor and a U-shaped lamp.

Referring to FIG. 17, the first and second light-emitting portions 111 and 112 of the U-shaped lamps 100 are extended along a third direction D3, and the circuit board 440 is disposed such that a longitudinal direction of the circuit board 440 is substantially parallel with a fourth direction D4 that is substantially perpendicular to the third direction D3. Alternatively, such a circuit board 440 and sensors 430 may be arranged relative to U-shaped lamps 101. Sensors 430 are disposed upon the circuit board 440.

Each of the sensors 430 has an electrically conductive plate shape. The sensors 430 face the first light-emitting portion 111 or the second light-emitting portion 112. The sensors 430 sense currents induced by electromagnetic waves generated from the U-shaped lamps 100 to output a sensing signal.

The circuit board 440 is electrically connected to the inverter 400 in FIG. 12 to apply the outputted sensing signal to the inverter 400.

The inverter 400 controls the U-shaped lamps 100, or alternatively U-shaped lamps 101, based on the outputted sensing signal. When one of the U-shaped lamps 100 or 101 is abnormal, the inverter 400 cuts off driving voltage applied to the U-shaped lamps 100 or 101 to stop operation in order to protect the U-shaped lamps 100 or 101 from being damaged.

Figure 18:
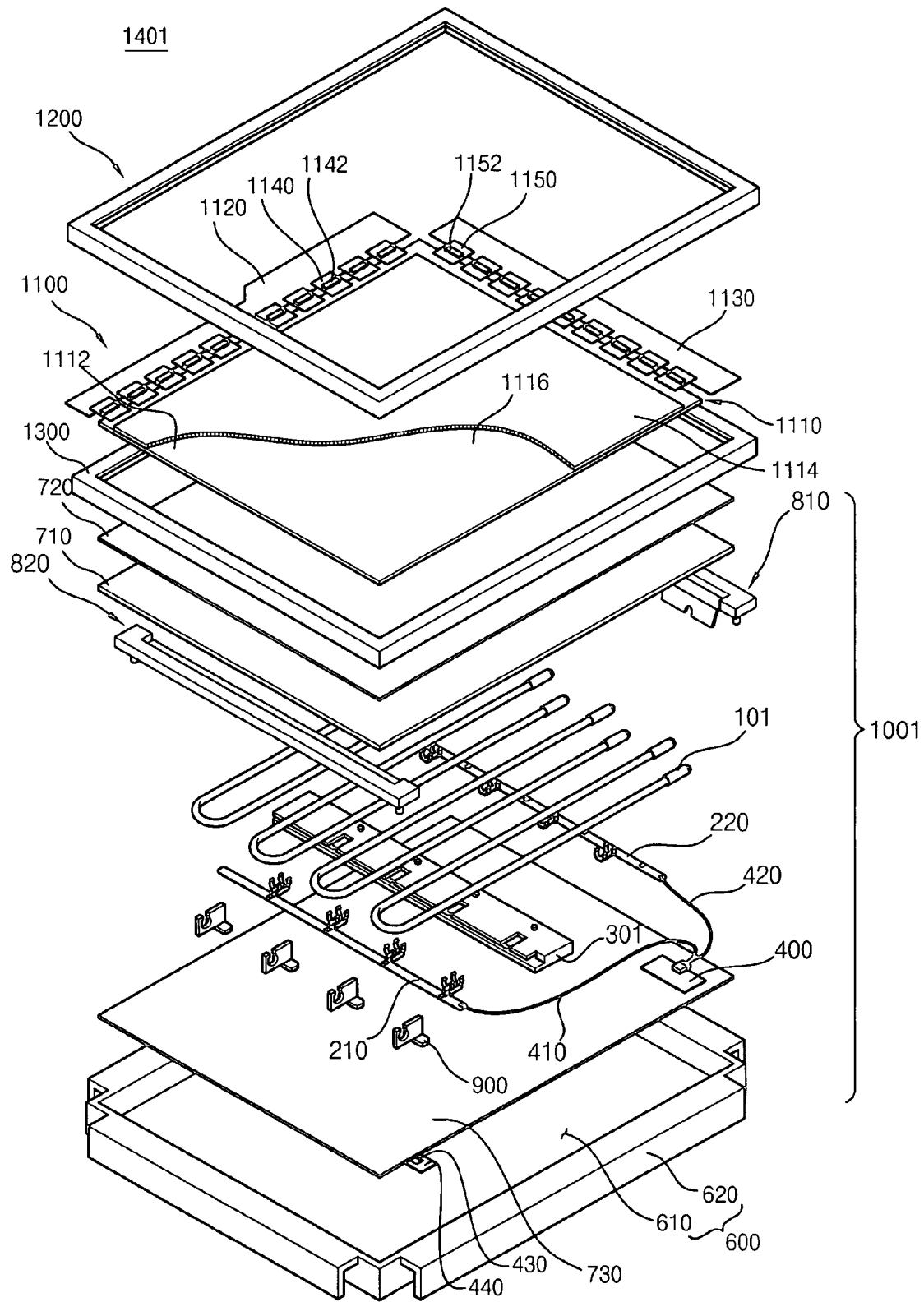
FIG. 18 is an exploded perspective view illustrating an exemplary embodiment of an LCD device according to the present invention.

FIG. 18 is an exploded perspective view illustrating an exemplary embodiment of an LCD device according to the present invention.

Referring to FIG. 18, an LCD device 1401 includes a backlight assembly 1001 and a display unit 1100.

The display unit 1100 includes an LCD panel 1110, a data printed circuit board ("data PCB") 1120, a gate printed circuit board ("gate PCB") 1130, a data flexible printed circuit ("data FPC") 1140 and a gate flexible printed circuit ("gate FPC") 1150. The data and gate PCBs 1120 and 1130 are electrically connected to the LCD panel 1110 through the data and gate FPCs 1140 and 1150, respectively. The data and gate FPCs 1140 and 1150 include a data driver chip 1142 and a gate driver chip 1152, respectively, for converting control signals provided from an external device into driving signal.

The LCD panel 1110 includes a thin film transistor ("TFT") substrate 1112, a color filter substrate 1114 facing the TFT substrate 1112, and a liquid crystal layer 1116 disposed between the TFT substrate 1112 and the color filter substrate 1114.

The TFT substrate 1112 includes a glass substrate and a plurality of TFTs (not shown) formed on the glass substrate. The TFTs are arranged in a matrix shape. Each of the TFTs includes a source electrode that is electrically connected to one of a plurality of source lines, a gate electrode that is electrically connected to one of a plurality of gate lines, and a drain electrode that is electrically connected to one of a plurality of pixel electrodes (not shown). Each pixel electrode includes an optically transparent and electrically conductive material.

The color filter substrate 1114 includes a glass substrate, a plurality of color filters (not shown) having red-color filters, green-color filters and blue-color filters, and a common electrode (not shown) having an optically transparent and electrically conductive material.

The LCD device 1401 further includes a top chassis 1200 and a guide frame 1300. The top chassis 1200 surrounds edge portions of the LCD panel 1110 and combines with the receiving container 600 to fasten the LCD panel 1110 to the backlight assembly 1001. The top chassis 1200 protects the LCD panel 1110 and prevents the LCD panel 1110 from drifting.

The guide frame 1300 is disposed between the backlight assembly 1001 and the LCD panel 1110 to fix the light-diffusing plate 710 and the optical sheet 720. Additionally, the guide frame 1300 guides a position of the LCD panel 1110.

According to the above-described embodiments and their alternatives, the backlight assembly employs only one inverter for driving a plurality of U-shaped lamps electrically connected in parallel to enhance productivity.

Furthermore, the first and second wires for connecting the U-shaped lamp to the inverter are disposed at one side of the backlight assembly, so that interference between the wires and the U-shaped lamp is reduced.

Having described the exemplary embodiments of the present invention and its advantages, it is noted that various changes, substitutions and alterations can be made herein without departing from the spirit and scope of the invention as defined by appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A backlight assembly comprising:
   a plurality of U-shaped lamps, each of the plurality of U-shaped lamps including a U-shaped lamp tube, a first external electrode covering a first end portion of the U-shaped lamp tube, and a second external electrode covering a second end portion of the U-shaped lamp tube, the U-shaped lamp tube generating light when a first driving voltage is applied to the first external electrode and a second driving voltage is applied to the second external electrode, the first and second end portions of the U-shaped lamp tubes disposed at one end of the plurality of U-shaped lamps;
   a first connecting member electrically connected to each first external electrode of the plurality of U-shaped lamps to apply the first driving voltage to each first external electrode;
   a second connecting member electrically connected to each second external electrode of the plurality of U-shaped lamps to apply the second driving voltage to each second external electrode;
   a mold frame receiving the first and second connecting members, and disposing the first and second connecting members at the first end portions and the second end portions of the plurality of U-shaped lamps, respectively; and
   a receiving container receiving the plurality of U-shaped lamps and the mold frame;
   wherein an entirety of the mold frame is disposed at the one end portion of the plurality of U-shaped lamps.

2. The backlight assembly of claim 1, wherein the first connecting member comprises:
   a first base substrate, wherein the first base substrate is electrically conductive to receive the first driving voltage; and
   at least one first clip protruding from the first base substrate to combine with the first end portion of each U-shaped lamp tube to apply the first driving voltage to each first external electrode, and,
   wherein the second connecting member comprises:
   a second base substrate, wherein the second base substrate is electrically conductive to receive the second driving voltage; and
   at least one second clip protruding from the second base substrate to combine with the second end portion of each U-shaped lamp tube to apply the second driving voltage to each second external electrode.

3. The backlight assembly of claim 2, wherein the second connecting member further comprises at least one blocking protrusion that prevents the at least one U-shaped lamp from moving along a longitudinal direction of the at least one U-shaped lamp.

4. The backlight assembly of claim 2, wherein the first and second clips are alternatingly arranged within the backlight assembly, and a distance between one of the at least one first clip and an adjacent one of the at least one second clip is in a range from about 10 mm to about 50 mm.

5. The backlight assembly of claim 2, wherein each U-shaped lamp tube comprises:
   a first light-emitting portion;
   a second light-emitting portion extending substantially parallel with the first light-emitting portion, a length of the second light-emitting portion longer than a length of the first light-emitting portion; and
   a rounded portion connecting the first and second light-emitting portions.

6. The backlight assembly of claim 5, further comprising a mold frame receiving the first and second connecting members, the mold frame having a slit formed at a first side face for slidably receiving the first base substrate.

7. The backlight assembly of claim 6, wherein the mold frame further comprises at least one opening receiving the at least one first clip.

8. The backlight assembly of claim 6, wherein the first connecting member further comprises a fixing protrusion protruding downwardly from the first base substrate, and wherein the mold frame further comprises a fixing recession receiving the fixing protrusion to fasten the first connecting member to the mold frame.

9. The backlight assembly of claim 6, wherein the second connecting member is disposed on an upper face of the mold frame and disposed adjacent to a second side face of the mold frame, wherein the second side face of the mold frame is opposite to the first side face of the mold frame.

10. The backlight assembly of claim 9, wherein the mold frame further comprises a boss protruding upwardly from the upper face of the mold frame, and wherein the second base substrate of the second connecting member comprises a connection hole receiving the boss, and further wherein the boss is heated and compressed to fasten the second connecting member to the mold frame.

11. The backlight assembly of claim 5, wherein a difference between the length of the second light-emitting portion and the length of the first light-emitting portion is larger than a length of each of the first and second external electrodes.

12. The backlight assembly of claim 1, wherein the mold frame comprises a dielectric material, and wherein the mold frame has a first combining portion and a second combining portion for receiving the first and second connecting members, respectively.

13. The backlight assembly of claim 12, wherein the first combining portion includes a first slit, wherein the first connecting portion is slidably inserted into the first slit, and wherein the second combining portion includes a second slit, wherein the second connecting portion is slidably inserted into the second slit.

14. The backlight assembly of claim 13, wherein the first slit is formed at a first side face of the mold frame, the second slit is formed at a second side face of the mold frame, and the first and second slits are opposite to each other.

15. The backlight assembly of claim 14, wherein the mold frame comprises at least one first opening portion for receiving the at least one first clip of the first connecting member, and wherein the mold frame further comprises at least one second opening portion for receiving the at least one second clip of the second connecting member.

16. The backlight assembly of claim 1, wherein the first and second connecting members comprise a first fixing protrusion and a second fixing protrusion protruded from the first and second base substrates, respectively, and wherein the mold frame further comprises a first fixing recession and a second fixing recession receiving the first and second fixing protrusions, respectively, to fasten the first and second base substrates to the mold frame.

17. The backlight assembly of claim 1, wherein the mold frame further comprises at least one blocking protrusion that prevents the at least one U-shaped lamp from moving along a longitudinal direction of the at least one U-shaped lamp.

18. The backlight assembly of claim 1, wherein the first and second connecting members are substantially parallel with each other, and wherein the first and second connecting members are spaced apart from each other by at least about 2 mm.

19. The backlight assembly of claim 1, wherein each U-shaped lamp tube comprises:
a first light-emitting portion;
a second light-emitting portion extending substantially parallel to the first light emitting portion; and
a rounded portion connecting the first and second light-emitting portions.

20. The backlight assembly of claim 19, further comprising at least one fixing member combined with the rounded portion of each U-shaped lamp to fix each U-shaped lamp within the backlight assembly.

21. The backlight assembly of claim 19, further comprising a light-diffusing plate that diffuses light generated from the at least one U-shaped lamp, and wherein a distance between a central longitudinal axis of the first light-emitting portion and a central longitudinal axis of the second light-emitting portion is substantially equal to or less than three times a distance between the at least one U-shaped lamp and the light-diffusing plate.

22. The backlight assembly of claim 19, further comprising:
a first mold cover that covers the first and second end portions of the at least one U-shaped lamp; and
a second mold cover that covers the rounded portion of the at least one U-shaped lamp.

23. The backlight assembly of claim 1, wherein the first driving voltage is a reference voltage and the second driving voltage is an alternating voltage alternating with respect to the reference voltage.

24. The backlight assembly of claim 1, wherein the first and second driving voltages are alternating voltages having opposite phases with each other.

25. A display device comprising:
a display panel that displays an image by using light; and
a backlight assembly that provides the display panel with the light, the backlight assembly comprising:
a plurality of U-shaped lamps, each of the plurality of U-shaped lamps including a U-shaped lamp tube, a first external electrode covering a first end portion of the U-shaped lamp tube, and a second external electrode covering a second end portion of the U-shaped lamp tube, the U-shaped lamp tube generating light when a first driving voltage is applied to the first external electrode and a second driving voltage is applied to the second external electrode, the first and second end portions of the U-shaped lamp tubes being disposed at one end of the plurality of U-shaped lamps;
a first connecting member electrically connected to each first external electrode of the plurality of U-shaped lamps to apply the first driving voltage to the first external electrode;
a second connecting member electrically connected to each second external electrode of the plurality of U-shaped lamps to apply the second driving voltage to the second external electrode; and
a mold frame receiving the first and second connecting members, and disposing the first and second connecting members at the first end portions and the second end portions of the plurality of U-shaped lamps, respectively; and
a receiving container receiving the plurality of U-shaped lamps and the mold frame;
wherein an entirety of the mold frame is disposed at the one end portion of the plurality of U-shaped lamps.

26. The display device of claim 25, wherein the first connecting member comprises:
a first base substrate, wherein the first base substrate is electrically conductive to receive the first driving voltage; and
at least one first clip protruding from the first base substrate to combine with the first end portion of each U-shaped lamp tube to apply the first driving voltage to each first external electrode, and wherein the second connecting member comprises:
a second base substrate, wherein the second base substrate is electrically conductive to receive the second driving voltage; and
at least one second clip protruding from the second base substrate to combine with the second end portion of each U-shaped lamp tube to apply the second driving voltage to each second external electrode.

27. The display device of claim 26, wherein the mold frame comprises a dielectric material.

28. The display device of claim 25, wherein each U-shaped lamp tube comprises:
a first light-emitting portion;
a second light-emitting portion extending substantially parallel with the first light-emitting portion, a length of the second light-emitting portion longer than a length of the first light-emitting portion; and
a rounded portion connecting the first and second light-emitting portions.

29. The display device of claim 25, further comprising:
a receiving container that receives the backlight assembly and the display panel; and
a top chassis that surrounds an edge portion of the display panel and combines with the receiving container to fasten the display panel to the receiving container.

30. The display device of claim 29, further comprising an inverter that applies the first and second driving voltages to the first and second external electrodes, respectively, wherein the inverter is disposed at a backside of the receiving container.

31. A backlight assembly comprising:
a plurality of U-shaped lamps, each of the plurality of U-shaped lamps including a first end portion and a second end portion;
a first single connecting member electrically connected to each of the first end portions of the plurality of U-shaped lamps, and a second single connecting member electrically connected to each of the second end portions of the plurality of U-shaped lamps;
a mold frame receiving the first and second single connecting members, and disposing the first and second single connecting members at the first end portions and the second end portions of the plurality of U-shaped lamps, respectively;
a single inverter electrically connected to the plurality of U-shaped lamps; and
a receiving container receiving the plurality of U-shaped lamps and the mold frame,
wherein the inverter provides first and second driving voltages to each lamp within the plurality of U-shaped lamps, the first end portions and the second end portions are disposed at one end of the plurality of U-shaped lamps, and an entirety of the mold frame is disposed at the one end of the plurality of U-shaped lamps.

32. The backlight assembly of claim 31, having an upper surface for emitting light from the backlight assembly, and an opposite lower surface, the backlight assembly further having a plurality of sides, each lamp in the plurality of lamps having a first external electrode and a second external electrode, wherein the first external electrode and the second external electrode are positioned adjacent a first side in the plurality of sides of the backlight assembly.

33. The backlight assembly of claim 32, wherein first and second wires extending from the inverter both extend towards the first side of the backlight assembly.

* * * * *